2,890,988

PROCESS FOR UTILIZING MYCELIUM WASTE FROM THE PRODUCTION OF CITRIC ACID AND FOR THE SACCHARIFICATION OF AMYLACEOUS RAW MATERIAL

Mikuláš Burger, Karel Beran, and Zdeněk Fencl, Prague, Czechoslovakia

No Drawing. Application November 26, 1956
Serial No. 624,220

Claims priority, application Czechoslovakia
December 1, 1955

8 Claims. (Cl. 195—67)

Many methods have been described for utilizing amylolytic mold products in the preparation of mashes from starch containing raw materials. The researches made show that mold preparations offer many advantages when used instead of malt. It can be concluded from biochemical studies of the enzymatic composition of mold preparations and of the mechanism of the hydrolysis of starch that the main advantage of these preparations consists therein that beside other enzymes they contain relatively high proportions of maltase, whilst malt contains only very small variable amounts of this enzyme. It has been proved that the said enzyme has a decisive effect on the yield of alcohol due to the fact that maltase hydrolyses starch directly and contrary to amylases it splits very vigorously also lower dextrins including the so called boundary dextrins with 1,6-glucosidic bonds. It is known that maltase is capable of splitting not only starch and maltose but isomaltose, i.e. a sugar with a 1,6-glucosidic bond, as well. A further advantage of this enzyme derived from molds consists in its relatively high stability against heat and in strong acid media and in its stability also in the dry state.

A most efficient splitting of starch can be attained, therefore, when using enzymatic preparations with high contents of maltase in the hydrolysis of amylaceous materials, such splitting being a condition for obtaining high yields in the alcoholic fermentation of saccharified amylaceous mashes.

When using mold preparations it has been necessary so far to prepare mold cultures either submersed directly in the fermentation mash ("amyloprocess") or by a special process of submersed or surface cultivation.

The manufacture of mold preparations is rather expensive. It is of sufficient value to repay the effort only if such preparations are able to increase the yield of alcohol and to intensify the production.

The present invention relates to a process for utilizing mycelium waste from the production of citric acid by transforming it into an enzymatic preparation and by using this preparation for saccharifying amylaceous mashes. The said mycelium waste is washed, mechanically dewatered, heated to 50° C. for a few hours until the cells are autolysed and thereafter dried at a temperature not exceeding 65° C. and ground. The mycelium refuse is further utilized by using the residual liquids of the fermentation process as fodder after distilling off the spirit. If desired, the mycelium waste treated as above may be added to the mashes in excess, the residual liquids being then enriched by albumens and growth supporting matter. The preliminary liquefaction of the amylaceous mash may be carried out, if desired, by means of other enzymatic mold preparations or by means of malt and thereafter the proper saccharification with the enzymatic preparation from the mycelium waste may proceed.

Heretofore mycelium waste from the production of citric acid was considered as refuse of no particular practical value. Occasionally it has been used as fertilizer and it has also been suggested using it as admixture to fish fodder. These uses of the mycelium waste did not pay whilst the utilization of the mycelium waste according to the invention is a commercial proposition of major interest to the citric acid industry as well as to distilleries and to agriculture.

Due to the low pH value the physiological conditions in the citric acid production are not favorable for an intensive formation of alpha-amylase. The preparation made from mycelium waste contains only small amounts of this enzyme. The inventors have found that maltase, however, is in the enzymatic preparation still present in a larger proportion. This enzyme takes a very important part in the hydrolysis of starch and its presence in the enzymatic preparation used in the saccharification of amylaceous materials is desirable.

Using the preparation in agricultural distilleries does not require special provisions. Particularly for such distilleries are also of major interest the resulting residual liquids enriched by albumens and growth supporting matter from the mycelium in view of their increased value as fodder. Until now it has not been possible utilizing the mycelium for feeding animals of higher order in view of their high content of spores which are in the process according to the invention rendered harmless during the distillation of the mashes.

In mold preparations specially cultivated, e.g. on brans, the activity of the maltase is very high. In the mycelium waste from the citric acid fermentation is the activity of the maltase somehow lower but such mycelium waste does not contain alpha-amylase at all or in minute quantities only. It is necessary, therefore, either to use preparations made from mycelium waste together with a small amount of malt or another amylolytic mold or bacterium preparation containing a sufficient proportion of alpha-amylase or to use the mycelium waste preparation in excess. In such a case use is made of the ability of the present maltase of hydrolysing starch directly.

*Example 1*

Mycelium waste from the citric acid fermentation is thoroughly washed with pure water to remove not only citric acid but also present ferrocyanides conventionally added to the substratum in the citric acid fermentation. The washed mycelium is mechanically deprived of its main water content by pressing or centrifuging. The mycelium is thereafter transferred into a chamber wherein an elevated temperature not exceeding 50° C. is maintained for a period of 10 to 40 hours. The increase of the temperature of the mycelium is due to selfheating provoked by physiological processes within the mold. At this temperature growth of secondary mycelium and partial autolysis (cracking of the cells and their content flowing out) takes place at the same time, increasing substantially the enzymatic activity of the preparation.

The mycelium is then fully dried in a stream of cold or tepid air, the temperature during the drying must not exceed 65° C. The dried mycelium is finally ground and used in distilleries for saccharifying amylaceous mashes.

The vessel wherein saccharification takes place is charged with potatoes steamed in the usual way. An enzymatic preparation of the mold *Aspergillus oryzae* had been brought into the vessel in advance and mixed with water. During chasing out the temperature in the saccharification vessel should not exceed 50 to 55° C., whilst afterwards the temperature in the vessel is preferably adjusted to 55 to 60° C. and maintained at this height for 15 to 30 minutes. Thereafter the temperature in the vessel is increased again, it should not exceed 65 to 70° C. however, and the enzymatic preparation of the mycelium waste from the production of citric acid (hereafter called "mycelium waste preparation") is added.

The mass is maintained at this temperature for about 1 hour until saccharification is completed. Preferably the saccharified mass had been acidified in advance, the pH value should, however, not be under 4 to 4.5. When adjusting the pH value the acidity of the mycelium waste preparation itself must be taken in consideration. These preparations are acid, this being also the reason that they cannot be added into the saccharification vessel at the stage of discharging (chasing out) the steamed mass.

The total amount of the enzymatic preparations added to the mass depends on their activity. The amount of the *Aspergillus oryzae* preparation added to attain liquefaction may vary between 0.5 to 5 percent and the proportion of the mycelium waste preparation between 5 to 25 percent of the weight of the starch. If desired, a portion or the whole of the mycelium waste preparation may be added to the sugary mash when the mass had cooled down after a partial saccharification, before the mass is transferred into the fermentation vessel. The saccharification of the mass is then completed during the fermentation.

Ferrocyanide contained in any charge may be removed subsequently, by adding a small amount of a ferric salt, in the form of a ferric ferrocyanide precipitate by filtration. As a rule not more than 0.05 percent of this salt with regard to the weight of the mycelium waste preparation is needed.

*Example 2*

The mycelium is prepared, the saccharification carried out, the pH value adjusted and, if necessary, the ferric salt added as described in Example 1, but for liquefying the mass malt is used instead of the *Aspergillus oryzae* preparation. The malt is added in an amount of 0.5 to 6 percent with regard to the weight of the starch. When using the usual types of malt not more than 0.5 to 1.5 percent are needed. The temperature in the saccharification vessel is preferably maintained between 60 to 65° C. during chasing out the steamed mass.

*Example 3*

The mycelium is prepared as described in Example 1. The vessel is charged with potatoes steamed in the usual way, but into this vessel a portion (about one third) of the total quantity of the mycelium waste preparation used had been added and mixed with water. The process of chasing out the steamed mass is the same as when using malt, the temperature in the saccharification vessel should not, however, exceed 60 to 65° C. After chasing out the mass into the saccharification vessel the temperature is adjusted to 65 to 70° C. This temperature is maintained for 1 hour until saccharification is complete. The pH value may be adjusted before as explained in Example 1.

Apart from the addition of the first portion of the preparation it is without particular importance in view of the completeness of the saccharification in which intervals of time the single portions of the preparation are added.

The whole amount of the preparation used may be added e.g. all at once at the beginning of the chasing out operation. As already mentioned before the total added amount of the mycelium waste preparation depends on its activity and may be 25 percent or more of the weight of starch. The quantity of the added preparation varies also according to the desired enrichment of the residual liquids by albumens and growth supporting matter from the mycelium for feeding purposes.

We claim:

1. In a method of treating mycelium waste, the step of maintaining mycelium waste at an elevated temperature of up to 50° C. for a time period sufficient to cause simultaneously on the one hand at least partial autolyzation of the cells of said mycelium waste and on the other hand growth of secondary mycelium having a maltase content higher than the maltase content of said mycelium waste, whereby a mycelium mass of relatively high maltase content and adapted for the saccharification of amylaceous material is formed.

2. A method for producing from mycelium waste having a relatively low maltase content an enzymatic preparation of relatively high maltase content, comprising the steps of washing said mycelium waste; mechanically dewatering the washed mycelium waste; heating the thus mechanically dewatered mycelium waste to an elevated temperature of up to 50° C. for a time period sufficient to cause simultaneously on the one hand at least partial autolyzation of the cells of said mycelium waste and, on the other hand, growth of secondary mycelium having a maltase content higher than the maltase content of said mycelium waste; and drying the thus formed mass at a temperature of between 50° C. and 65° C., whereby a dried mycelium mass of relatively high maltase content and adapted for the saccharification of amylaceous material is formed.

3. A method for producing from mycelium waste obtained in the production of citric acid and having a relatively low maltase content an enzymatic preparation of relatively high maltase content, comprising the steps of washing said mycelium waste; mechanically dewatering the washed mycelium waste with water so as to remove water soluble impurities therefrom; heating the thus mechanically dewatered mycelium waste to an elevated temperature of up to 50° C. for a time period sufficient to cause simultaneously on the one hand at least partial autolyzation of the cells of said mycelium waste and, on the other hand, growth of secondary mycelium having a maltase content higher than the maltase content of said mycelium waste; and drying the thus formed mass at a temperature of between 50° C. and 65° C., whereby a dried mycelium mass of relatively high maltase content and adapted for the saccharification of amylaceous material is formed.

4. A method for producing from mycelium waste obtained in the production of citric acid and having a relatively low maltase content an enzymatic preparation of relatively high maltase content, comprising the steps of washing said mycelium waste with water so as to remove water soluble impurities therefrom; mechanically dewatering the washed mycelium waste; heating the thus mechanically dewatered mycelium waste to an elevated temperature of up to 50° C. for a time period of between 10 and 40 hours so as to cause simultaneously on the one hand at least partial autolyzation of the cells of said mycelium waste and, on the other hand, growth of secondary mycelium having a maltase content higher than the maltase content of said mycelium waste; and drying the thus formed mass at a temperature of between 50° C. and 65° C., whereby a dried mycelium mass of relatively high maltase content and adapted for the saccharification of amylaceous material is formed.

5. A method for producing from mycelium waste obtained in the production of citric acid and having a relatively low maltase content an enzymatic preparation of relatively high maltase content, comprising the steps of washing said mycelium waste with water so as to remove water soluble impurities therefrom; mechanically dewatering the washed mycelium waste; heating the thus mechanically dewatered mycelium waste to an elevated temperature of up to 50° C. for a time period of between 10 and 40 hours so as to cause simultaneously on the one hand at least partial autolyzation of the cells of said mycelium waste and, on the other hand, growth of secondary mycelium having a maltase content higher than the maltase content of said mycelium waste; drying the thus formed mass at a temperature of between 50° C. and 65° C.; and grinding the thus dried mass, whereby a subdivided dried mycelium mass of relatively high maltase content and adapted for the saccharification of amylaceous material is formed.

6. A method for producing from mycelium waste obtained in the production of citric acid and having a relatively low maltase content an enzymatic preparation of relatively high maltase content, comprising the steps of washing said mycelium waste with water so as to remove water soluble impurities therefrom; centrifuging the washed mycelium waste so as to remove water therefrom; heating the thus mechanically dewatered mycelium waste to an elevated temperature of up to 50° C. for a time period of between 10 and 40 hours so as to cause simultaneously on the one hand at least partial autolyzation of the cells of said mycelium waste and, on the other hand, growth of secondary mycelium having a maltase content higher than the maltase content of said mycelium waste; and drying the thus formed mass at a temperature of between 50° C. and 65° C., whereby a dried mycelium mass of relatively high maltase content and adapted for the saccharification of amylaceous material is formed.

7. A method for producing from mycelium waste obtained in the production of citric acid and having a relatively low maltase content an enzymatic preparation of relatively high maltase content, comprising the steps of washing said mycelium waste with water so as to remove water soluble impurities therefrom; pressing the washed mycelium waste so as to remove water therefrom; heating the thus mechanically dewatered mycelium waste to an elevated temperature of up to 50° C. for a time period of between 10 and 40 hours so as to cause simultaneously on the one hand at least partial autolyzation of the cells of said mycelium waste and, on the other hand, growth of secondary mycelium having a maltase content higher than the maltase content of said mycelium waste; and drying the thus formed mass at a temperature of between 50° C. and 65° C., whereby a dried mycelium mass of relatively high maltase content and adapted for the saccharification of amylaceous material is formed.

8. In a method of treating mycelium waste, the steps of washing mycelium waste obtained in the production of citric acid with water so as to remove water soluble impurities therefrom; mechanically dewatering the washed mycelium waste; heating the thus mechanically dewatered mycelium waste to an elevated temperature of up to 50° C. for a time period sufficient to cause simultaneously on the one hand at least partial autolyzation of the cells of said mycelium waste and, on the other hand, growth of secondary mycelium having a maltase content higher than the maltase content of said mycelium waste; drying the thus formed mass at a temperature of between 50° C. and 65° C.; grinding the thus dried mass, whereby a subdivided dried mycelium mass of relatively high maltase content is formed; and saccharifying an amylaceous material with said mycelium mass of high maltase content.

References Cited in the file of this patent

Tauber: "Chemistry and Technology of Enzymes," 1949, publ. by John Wiley & Sons, Inc. (N.Y.), pages 403 to 406.

Prescott et al.: "Industrial Microbiology," 1949, publ. by McGraw-Hill Book Co., Inc. (N.Y.), page 592.